(12) United States Patent
Karlsson

(10) Patent No.: US 7,512,061 B2
(45) Date of Patent: Mar. 31, 2009

(54) RECOVERY OF STATE INFORMATION OF A FIRST TUNNEL END-POINT

(75) Inventor: Julius Karlsson, Helsinki (FI)

(73) Assignee: Nokia Corporation, Espoo (FI)

( * ) Notice: Subject to any disclaimer, the term of this patent is extended or adjusted under 35 U.S.C. 154(b) by 650 days.

(21) Appl. No.: 11/099,540

(22) Filed: Apr. 6, 2005

(65) Prior Publication Data

US 2006/0182019 A1 Aug. 17, 2006

(30) Foreign Application Priority Data

Feb. 11, 2005 (FI) .................................. 20050158

(51) Int. Cl.
*H04L 12/28* (2006.01)
(52) U.S. Cl. ...................... 370/216; 370/389
(58) Field of Classification Search ................ 370/218, 370/392, 216, 236, 394; 709/227
See application file for complete search history.

(56) References Cited

U.S. PATENT DOCUMENTS

| 6,470,462 | B1 * | 10/2002 | Karlsson et al. ............. 714/11 |
| 6,487,689 | B1 * | 11/2002 | Chuah ....................... 714/748 |
| 6,567,376 | B1 * | 5/2003 | Karlsson et al. ............ 370/216 |
| 2006/0168241 | A1 * | 7/2006 | Puthiyandyil et al. ....... 709/227 |

FOREIGN PATENT DOCUMENTS

| EP | 1067744 | 1/2001 |
| EP | 1069735 | 1/2001 |

OTHER PUBLICATIONS

Vipin Jain (Riverstone Networks Editor), "Fail Over extensions for L2TP failover", Sep. 2004, pp. 1-15.
J. Lau, et al (Cisco Systems), I. Goyret, Ed. (Lucent Technologies, "Layer Two Tunneling Protocol—Version 3 (L2TPv 3)", Dec. 2004, pp. 1-3, 23, & 54.

* cited by examiner

*Primary Examiner*—Robert W Wilson
(74) *Attorney, Agent, or Firm*—Squire, Sanders & Dempsey, L.L.P.

(57) ABSTRACT

A method for recovering state information of a first tunnel endpoint of a point to point connection between the first tunnel endpoint and a second tunnel endpoint, the state information comprising a first state variable comprising a sequence number for sent messages and a second state variable comprising a sequence number for received messages. The method comprises detecting a crash of the first tunnel endpoint with a backup tunnel endpoint of the first tunnel endpoint, sending, from the backup tunnel endpoint, at least one request message to the second tunnel endpoint, and recovering the first state variable and the second state variable of the first tunnel endpoint based on the state variables present in at least one response message from the second tunnel endpoint.

25 Claims, 2 Drawing Sheets

RECOVERY OF STATE INFORMATION OF A FIRST TUNNEL END-POINT

BACKGROUND OF THE INVENTION

1. Field of the Invention

The present invention relates to data communication systems. In particular, the present invention relates to novel and improved method, tunnel endpoint, system and computer program for recovering state information of a first tunnel endpoint of a point to point connection between the first tunnel endpoint and a second tunnel endpoint.

2. Description of the Related Art

Layer Two Tunneling Protocol (L2TP) is an extension of the Point-to-Point Tunneling Protocol (PPTP) used by an Internet service provider to enable the operation of a virtual private network over the Internet. FIG. 1 discloses the two main components that make up L2TP: the L2TP Access Concentrator (LAC) 10, which is the device that physically terminates a call and the L2TP Network Server (LNS) 14, which is the device that terminates and possibly authenticates the PPP stream. In FIG. 1, the LAC 12 and the LNS 14 are connected with each other via a data network 12, e.g. the Internet.

PPP defines a means of encapsulation to transmit multiprotocol packets over layer two (L2) point-to-point links. Generally, a user connects to a network access server (NAS) through Integrated Services Digital Network (ISDN), Asynchronous Digital Subscriber line (ADSL) or other service and runs PPP over that connection.

L2TP uses packet-switched network connections to make it possible for the endpoints to be located on different machines. The user has an L2 connection to an access concentrator, which then tunnels individual PPP frames to the NAS, so that the packets can be processed separately from the location of the circuit termination. This means that the connection can terminate at a local circuit concentrator, eliminating possible long-distance charges, among other benefits. From the user's point of view, there is no difference in the operation.

The L2TP is used for tunneling PPP connections over packet switched networks. For each PPP connection an L2TP session is established. Establishment includes state full signaling between L2TP endpoints. The signaling happens over a reliable control channel, the L2TP tunnel. The receiving end acknowledges messages. If the sender did not receive an acknowledgement, the message is retransmitted a number of times. If no acknowledgements are received the messages and the control channel timeouts, which results in teardown of the L2TP, tunnel and all sessions established over it. In a High Availability (HA) system, the state of the sessions and the tunnel should be backed up, for example, by another physical box.

For each L2TP tunnel both tunnel endpoints maintain two essential variables for sequence numbering of messages: Ns and Nr. Ns is the sequence number of the last sent message. Nr is the next sequence number expected to receive. Since establishment of an L2TP session involves sending and receiving of multiple messages it would be complex and resource consuming to back up the state of Ns and Nr variables for every message received and sent. Usually it is acceptable in a crash situation to restart establishment of sessions, which are in the middle of initial signaling when a crash occurs. But if the state of Nr and Ns variables cannot be recovered all sessions within the crashed tunnel are lost.

One solution to the afore-mentioned problem would be to maintain full state information for each session in both tunnel endpoints. Such a solution would, however, require support from both endpoints.

SUMMARY OF THE INVENTION

According to a first aspect of the invention there is provided a method for recovering state information of a first tunnel endpoint of a point to point connection between the first tunnel endpoint and a second tunnel endpoint, the state information comprising a first state variable comprising a sequence number for sent messages and a second state variable comprising a sequence number for received messages. The method comprises detecting a crash of the first tunnel endpoint with a backup tunnel endpoint of the first tunnel endpoint, sending, from the backup tunnel endpoint, at least one request message to the second tunnel endpoint, and recovering the first state variable and the second state variable of the first tunnel endpoint based on state variables present in at least one response message from the second tunnel endpoint.

According to a second aspect of the invention there is provided a tunnel endpoint for recovering state information of a first tunnel endpoint, wherein the state information comprises a first state variable comprising a sequence number for sent messages and a second state variable comprising a sequence number for received messages. The tunnel endpoint comprises a detector configured to detect a crash of the first tunnel endpoint, a transmitter configured to send at least one response message to the second tunnel endpoint, a receiver configured to receive at least one request message from the second tunnel endpoint, and a recovering entity configured to recover the first state variable and the second state variable of the first tunnel endpoint based on the state variables present in the at least one response message from the second tunnel endpoint.

According to a third aspect of the invention there is provided a system for recovering state information. The system comprises a first tunnel endpoint, a backup tunnel endpoint for the first tunnel endpoint, a second tunnel endpoint, a point to point connection between the first tunnel endpoint and the second tunnel endpoint, a first state variable in each of the first and second tunnel endpoints comprising a sequence number for sent messages and a second state variable in each of the first and second tunnel endpoints comprising a sequence number for received messages. The backup tunnel endpoint comprises a detector configured to detect a crash of the first tunnel endpoint, a transmitter configured to send at least one request message to the second tunnel endpoint, a receiver configured to receive at least one response message from the second tunnel endpoint, and a recovering entity configured to recover the first state variable and the second state variable of the first tunnel endpoint based on the state variables present in the at least one response message from the second tunnel endpoint.

According to a fourth aspect of the invention there is provided a computer program for recovering state information of a first tunnel endpoint of a point to point connection between the first tunnel endpoint and a second tunnel endpoint, the state information comprising a first state variable comprising a sequence number for sent messages and a second state variable comprising a sequence number for received messages. The computer program comprises code stored on at least one data-processing device readable medium, the code adapted to perform the following steps when executed on a data-processing device: detecting a crash of the first tunnel endpoint with a backup tunnel endpoint of the first tunnel endpoint, sending, from the backup tunnel endpoint, at least one request message to the second tunnel endpoint, and recovering the first state variable and the second state variable of the first tunnel endpoint based on state variables present in at least one response message from the second tunnel endpoint.

According to a fifth aspect of the invention there is provided a tunnel endpoint for recovering state information of a first tunnel endpoint, wherein the state information comprises a first state variable comprising a sequence number for sent messages and a second state variable comprising a sequence number for received messages. The tunnel endpoint comprises detecting means configured to detect a crash of the first tunnel endpoint, sending means configured to send at least one response message to the second tunnel endpoint, receiving means configured to receive at least one request message from the second tunnel endpoint, and recovering means configured to recover the first state variable and the second state variable of the first tunnel endpoint based on the state variables present in the at least one response message from the second tunnel endpoint.

According to a sixth aspect of the invention there is provided a system for recovering state information. The system comprises a first tunnel endpoint, a backup tunnel endpoint for the first tunnel endpoint, a second tunnel endpoint, a point to point connection between the first tunnel endpoint and the second tunnel endpoint, a first state variable in each of the first and second tunnel endpoints comprising a sequence number for sent messages and a second state variable in each of the first and second tunnel endpoints comprising a sequence number for received messages. The backup tunnel endpoint comprises detecting means configured to detect a crash of the first tunnel endpoint, sending means configured to send at least one request message to the second tunnel endpoint, receiving means configured to receive at least one response message from the second tunnel endpoint, and recovering means configured to recover the first state variable and the second state variable of the first tunnel endpoint based on state variables present in at least one response message from the second tunnel endpoint.

In one embodiment of the invention, the recovering the first state variable and the second variable of the first tunnel endpoint comprises: sending a hello message to the second tunnel endpoint from the backup tunnel endpoint, wherein the state variables in the hello message are set as current first and second state variables of the backup tunnel endpoint, receiving a response message from the second tunnel endpoint, wherein the state variables in the response message comprise the first and second state variables of the second tunnel endpoint, setting the second state variable of the backup tunnel endpoint as the first state variable in the response message incremented by one, and recovering the first state variable of the first tunnel endpoint when the second state variable in the response message equals the first state variable of the backup tunnel endpoint incremented by one.

In one embodiment of the invention, when the second state variable of the second tunnel endpoint in the response message does not equal with the first state variable of the backup tunnel endpoint incremented by one, the method further comprises setting the first state variable of the backup tunnel endpoint as the second state variable in the response message, sending a hello message to the second tunnel endpoint from the backup tunnel endpoint, wherein the state variables in the response message are set as current first and second state variables of the backup tunnel endpoint, receiving a response message from the second tunnel endpoint, wherein state variables in the hello message comprise first and second state variables of the second tunnel endpoint, setting the second state variable of the backup tunnel endpoint as the first state variable in the response message incremented by one, and recovering the first state variable of the first tunnel endpoint when the second state variable in the response message equals the first state variable of the backup tunnel endpoint incremented by one.

In one embodiment of the invention, the recovering the second state variable of the first tunnel endpoint comprises: initiating a new session between the backup tunnel endpoint and the second tunnel endpoint, sending a session initiation request message from the backup tunnel endpoint to the second tunnel endpoint, wherein state variables in the session initiation request message are set as current first and second state variables of the backup tunnel endpoint, receiving a session initiation response message from the second tunnel endpoint, wherein the state variables in the session initiation response message comprise the first and second state variables of the second tunnel endpoint, recovering the second state variable of the first tunnel endpoint from the first state variable of the second tunnel endpoint present in the session initiation response message, and disconnecting the initiated session.

In one embodiment of the invention, the method further comprises sending an incoming call request message to the second tunnel endpoint as the session initiation request message, and receiving an incoming call reply message as the session initiation response message. In another embodiment of the invention, the method further comprises sending an outgoing call request message to the second tunnel endpoint as the session initiation request message, and receiving an outgoing call reply message as the session initiation response message.

In one embodiment of the invention, the first state variable comprises the sequence number of a last sent message and the second state variable comprises a next sequence number expected to receive.

In one embodiment of the invention, the point to point connection is a Layer Two Tunneling Protocol tunnel.

The present invention has several advantages over the prior-art solutions. The solution disclosed in the invention does not need any changes to the other endpoint of the tunnel, and therefore does not require any support from an L2TP peer. Furthermore, the invention is simple to implement, and the recovery of sequence numbers done by the invention is fast and reliable.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE PREFERRED EMBODIMENTS

Reference will now be made in detail to the embodiments of the present invention, examples of which are illustrated in the accompanying drawings.

Figure 1:
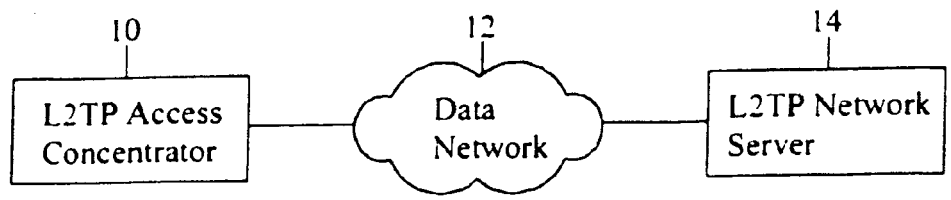
FIG. 1 is a block diagram illustrating prior art architecture of the L2TP topology, FIG. 2a discloses the recovery process of the NsB variable according to one embodiment of the invention, FIG. 2b discloses the recovery process of the NrB variable according to one embodiment of the invention, and FIG. 3 discloses a block diagram illustrating a system according to one embodiment of the invention.
Figure 2A:
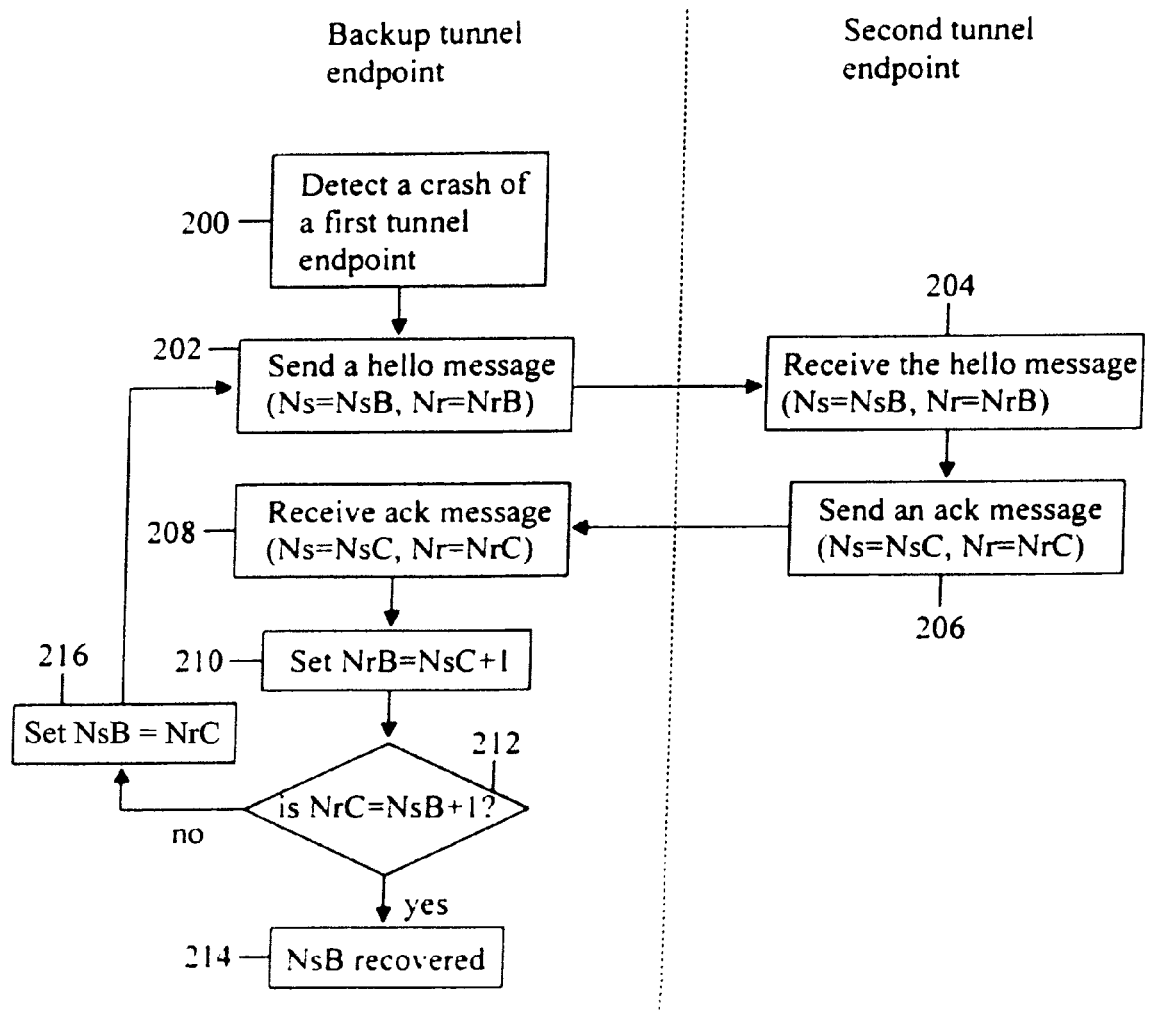
Figure 2B:
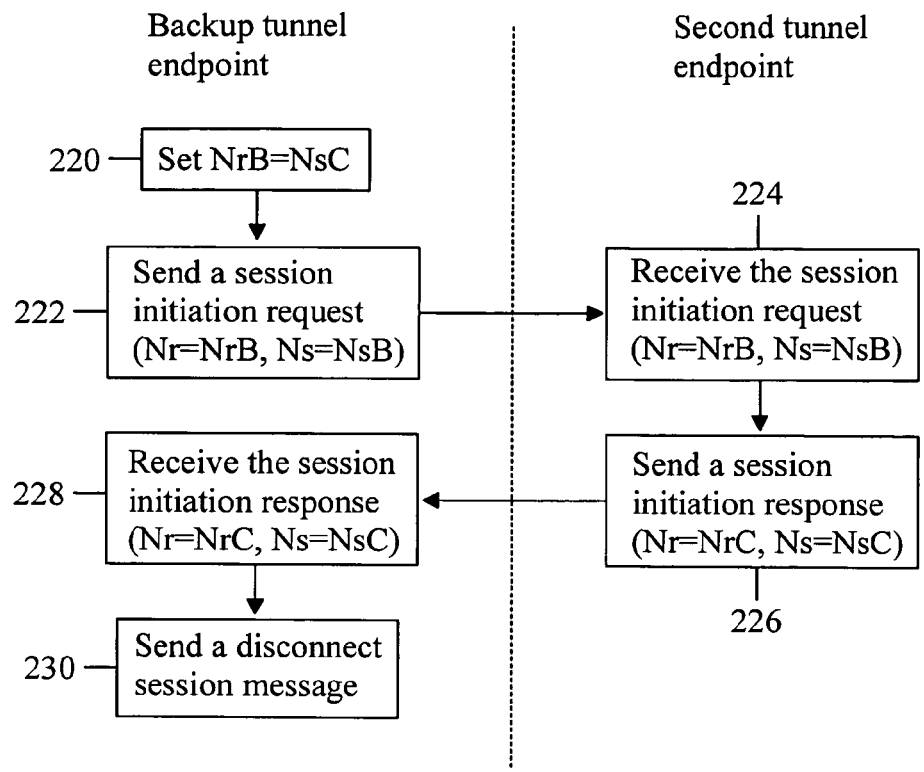

FIG. 2a discloses one embodiment of the recovery process of NrB variable. In FIG. 2b a backup tunnel endpoint becomes active after a primary tunnel endpoint, namely a first tunnel endpoint, becomes unable to provide services. Let A be the first tunnel endpoint (L2TP node), B the backup tunnel endpoint for A and C the second tunnel endpoint for the L2TP tunnel. Variables Ns and Nr of A, B, and C are marked with NsA and NrA, NsB and NrB, and NsC and NrC, respectively. As disclosed earlier, Ns is the sequence number of the last sent message and Nr is the next sequence number expected to receive.

In block 200 the backup tunnel endpoint notices when the first tunnel endpoint crashes. Therefore, the backup tunnel endpoint starts receiving all messages originally destined to the first tunnel endpoint. The backup tunnel endpoint has values for NsB and NrB, but these values are likely to be slightly obsolete. Therefore, the backup tunnel endpoint starts to recover the NsB variable. In block 202 the backup tunnel endpoint sends a Hello message to the second tunnel endpoint and sets Ns and Nr variables of the message to NsB and NrB. In block 204 the second tunnel endpoint receives the Hello message, and since the Ns in the message is smaller than NrC, the second tunnel endpoint considers the message as a retransmission. The retransmission interpretation is disclosed more accurately in RFC2661 (Request For Comments).

As disclosed in block 206, the second tunnel endpoint acknowledges the Hello message with an acknowledgement message and sets Ns and Nr variables of the message to NsC and NrC. In block 208 the backup tunnel endpoint receives the acknowledgement message. In block 210 the backup tunnel endpoint sets NrB to Ns of the acknowledgement message incremented by one. If Ns in the message is equal to NsB+1 (block 212), the backup tunnel endpoint has recovered NsB (block 214).

Otherwise the backup endpoint sets NsB to Nr of the acknowledgement message, that is, NrC (block 216) and processing returns back to block 202. Repetition may be required because it may happen that the Hello message sent by the backup tunnel endpoint arrives at the second tunnel endpoint before a message sent by the first tunnel endpoint just before crashing.

FIG. 2b discloses one embodiment of the recovery process of NrB variable. After recovering NsB, the backup tunnel endpoint starts to recover NrB. In block 220 the backup tunnel endpoint sets NrB to Ns as received in the acknowledgement message from the second tunnel endpoint. However, the second tunnel endpoint might have used a Zero-Length Body (ZLB) message for the acknowledgement. Since ZLB messages are not themselves acknowledged the Ns value in them is not reliable. RFC2661 states that Ns in a ZLB message should be ignored by a receiving end and set to Ns of the last signalling message sent before the ZLB by the sender.

To recover NrB reliably the backup tunnel endpoint has to force the second tunnel endpoint to send a real signaling message. To achieve this the backup tunnel endpoint starts establishment of a false L2TP session. The request used to initiate the session depends on the role of the backup tunnel endpoint as an L2TP tunnel endpoint. If backup tunnel endpoint is an LAC and the second tunnel endpoint is an LNS, the backup tunnel endpoint sends an Incoming Call Request (ICRQ) message to initiate the session and the reply from the second tunnel endpoint is an Incoming Call Reply (ICRP) message. If the backup tunnel endpoint is an LNS and the second tunnel endpoint is an LAC, the backup tunnel endpoint sends an Outpoing Call Request (OCRQ) message to initiate the session and the reply from the second tunnel endpoint is an outgoing Call Reply (OCRP) message.

In block 222 the backup tunnel endpoint sends a session initiation request to the second tunnel endpoint and sets Ns and Nr of the message to NsB and NrB. The second tunnel endpoint receives the message (block 224) and starts establishing the session to the backup tunnel endpoint and sends a session initiation response message and sets Ns and Nr of the message to NsC and NrC, block 226. The backup tunnel endpoint receives the message in block 228. Since the response message is a real signaling message, now Ns in the message is reliable. Finally the backup tunnel endpoint sends a Call Disconnect Notify (CDN) message to the second tunnel endpoint to disconnect the false session before it becomes active.

A further ground for using a signaling message for Nr recovery is that C might have signaling messages in its send queue waiting that a signaling message ahead of them is acknowledged. By sending e.g. an ICRQ message it is possible to know that the corresponding ICRP message gets to end of the queue and when receiving that it is possible know that it was the last message C had to send.

Figure 3:
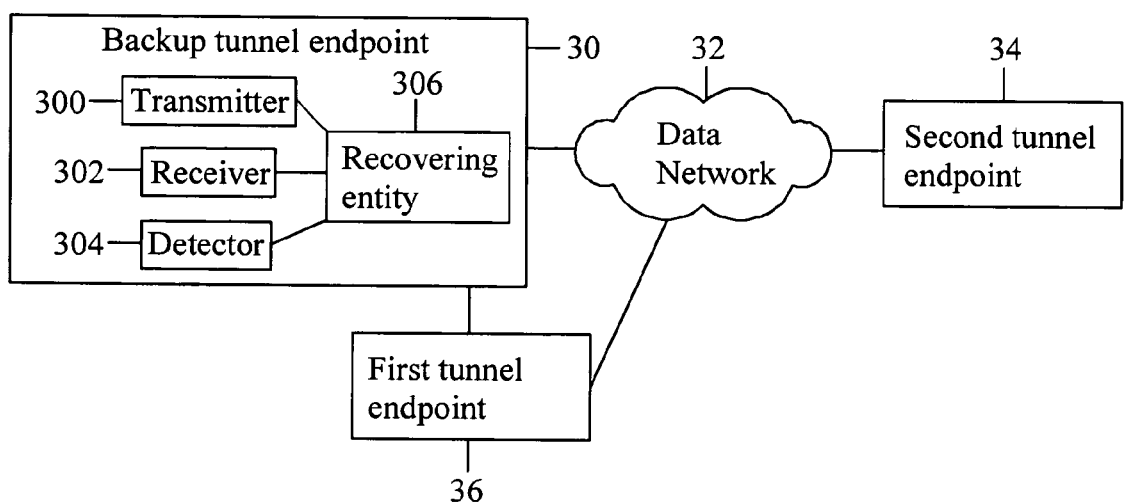

FIG. 3 discloses one embodiment of a system according to the invention. The system comprises a first tunnel endpoint 36 and a second tunnel endpoint 34 that are connected with each other via a data network 32, e.g. the Internet. The first tunnel endpoint 36 is backed up with a backup tunnel endpoint 30. When the first tunnel endpoint 36, for example, crashes, the backup tunnel endpoint 30 notices it and starts to receive messages from the second tunnel endpoint 34. The backup tunnel endpoint 30 comprises a detector 304 configured to detect a crash of the first tunnel endpoint 36, a transmitter 300 configured to send at least one request message to the second tunnel endpoint 34, a receiver 302 configured to receive at least one request message from the second tunnel endpoint 34, and a recovering entity 306 configured to recover the first state variable and the second state variable of the first tunnel endpoint 36 based on the state variables present in at least one response message from the second tunnel endpoint 34.

The recovering entity refers e.g. to a processing unit or to a combination of a processing unit and a memory. The backup tunnel endpoint may also include an additional memory or memories (not disclosed in FIG. 3) that may also include other applications or software components. The memory or memories may also include a computer program (or portion thereof), which when executed on a processing unit performs at least some of the steps of the invention. The processing unit may also include memory or a memory may be associated therewith which may include the computer program (or portion thereof) which when executed on the processing unit performs at least some of the steps of the invention.

It is obvious to a person skilled in the art that with the advancement of technology, the basic idea of the invention may be implemented in various ways. The invention and its embodiments are thus not limited to the examples described above, instead they may vary within the scope of the claims.

The invention claimed is:

1. A method comprising:
   detecting a crash of a first tunnel endpoint with a backup tunnel endpoint of the first tunnel endpoint;
   sending a hello message to a second tunnel endpoint from the backup tunnel endpoint, wherein state variables in the hello message are set as current first and second state variables of the backup tunnel endpoint;
   receiving a response message from the second tunnel endpoint, wherein state variables in the response message comprise first and second state variables of the second tunnel endpoint;
   setting the second state variable of the backup tunnel endpoint as the first state variable in the response message incremented by one;

recovering the first state variable of the first tunnel endpoint when the second state variable in the response message equals the first state variable of the backup tunnel endpoint incremented by one;

initiating a new session between the backup tunnel endpoint and the second tunnel endpoint;

sending a session initiation request message from the backup tunnel endpoint to the second tunnel endpoint, wherein state variables in the session initiation request message are set as current first and second state variables of the backup tunnel endpoint;

receiving a session initiation response message from the second tunnel endpoint, wherein the state variables in the session initiation response message comprise the first and second state variables of the second tunnel endpoint;

recovering the second state variable of the first tunnel endpoint from the first state variable of the second tunnel endpoint present in the session initiation response message; and disconnecting the initiated session, wherein the first state variable comprises a sequence number for sent messages and the second state variable comprises a sequence number for received messages.

2. The method according to claim 1, wherein when the second state variable of the second tunnel endpoint in the response message does not equal the first state variable of the backup tunnel endpoint incremented by one, the method further comprises:

setting the first state variable of the backup tunnel endpoint as the second state variable in the response message;

sending a hello message to the second tunnel endpoint from the backup tunnel endpoint, wherein the state variables in the hello message are set as current first and second state variables of the backup tunnel endpoint;

receiving a response message from the second tunnel endpoint, wherein the state variables in the response message comprise the first and second state variables of the second tunnel endpoint;

setting the second state variable of the backup tunnel endpoint as the first state variable in the response message incremented by one; and recovering the first state variable of the first tunnel endpoint when the second state variable in the response message equals the first state variable of the backup tunnel endpoint incremented by one.

3. The method according to claim 1, wherein the first state variable comprises the sequence number of a last sent message and the second state variable comprises a next sequence number expected to receive.

4. The method according to claim 1, wherein the point to point connection is a Layer Two Tunneling Protocol tunnel.

5. An apparatus, comprising:

a detector configured to detect a crash of a first tunnel endpoint, a transmitter configured to send a hello message to a second tunnel endpoint, wherein state variables in the hello message are set as current first and second state variables of the apparatus, a receiver configured to receive a response message from the second tunnel endpoint, wherein state variables in the response message comprise first and second state variables of the second tunnel endpoint, a recovering entity configured to set the second state variable of the apparatus as the first state variable in the response message incremented by one, wherein the recovering entity is configured to recover the first state variable of the first tunnel endpoint when the second state variable in the response message equals the first state variable of the apparatus incremented by one, the transmitter is configured to initiate a new session between the apparatus and the second tunnel endpoint by sending a session initiation request message to the second tunnel endpoint, wherein state variables in the session initiation request message are set as current first and second state variables of the apparatus, the receiver is configured to receive a session initiation response message from the second tunnel endpoint, wherein state variables in the session initiation response message comprise the first and second state variables of the second tunnel endpoint, the recovering entity is configured to recover the second state variable of the first tunnel endpoint from the first state variable of the second tunnel endpoint present in the session initiation response message, and the transmitter is configured to disconnect the initiated session by sending a disconnecting message to the second tunnel endpoint, wherein the first state variable comprises a sequence number for sent messages and the second state variable comprises a sequence number for received messages.

6. The apparatus according to claim 5, wherein when the second state variable of the second tunnel endpoint in the response message does not equal the first state variable of a backup tunnel endpoint incremented by one the recovering entity is configured to set the first state variable of the apparatus as the second state variable in the response message, the transmitter is configured to send a hello message to the second tunnel endpoint, wherein the state variables in the hello message are set as current first and second state variables of the apparatus, the receiver is configured to receive a response message from the second tunnel endpoint, wherein the state variables in the response message comprise first and second state variables of the second tunnel endpoint, the recovering entity is configured to set the second state variable of the apparatus as the first state variable in the response message incremented by one, and the recovering entity is configured to recover the first state variable of the first tunnel endpoint when the second state variable in the response message equals the first state variable of the apparatus incremented by one.

7. The apparatus according to claim 5, wherein the transmitter is configured to send an incoming call request message to the second tunnel endpoint as the session initiation request message, and the receiver is configured to receive an incoming call reply message as the session initiation response message.

8. The apparatus according to claim 5, wherein the transmitter is configured to send an outgoing call request message to the second tunnel endpoint as the session initiation request message, and the receiver is configured to receive an outgoing call reply message as the session initiation response message.

9. The method according to claim 1, further comprising:

sending an incoming call request message to the second tunnel endpoint as the session initiation request message; and receiving an incoming call reply message as the session initiation response message.

10. The method according to claim 1, further comprising:
sending an outgoing call request message to the second tunnel endpoint as the session initiation request message; and
receiving an outgoing call reply message as the session initiation response message.

11. The apparatus according to claim 5, wherein the first state variable comprises the sequence number of a last sent message and the second state variable comprises a next sequence number expected to receive.

12. The apparatus according to claim 5, wherein the apparatus comprises a Layer Two Tunneling Protocol tunnel endpoint.

13. A system, comprising:
a first tunnel endpoint;
a backup tunnel endpoint for the first tunnel endpoint;
a second tunnel endpoint;
a point to point connection between the first tunnel endpoint and the second tunnel endpoint;
a first state variable in each of the first and second tunnel endpoints comprising a sequence number for sent messages; and
a second state variable in each of the first and second tunnel endpoints comprising a sequence number for received messages, wherein the backup tunnel endpoint comprises
a detector configured to detect a crash of the first tunnel endpoint,
a transmitter configured to send a hello message to the second tunnel endpoint, wherein state variables in the hello message are set as current first and second state variables of the apparatus,
a receiver configured to receive a response message from the second tunnel endpoint, wherein state variables in the response message comprise the first and second state variables of the second tunnel endpoint,
a recovering entity confirmed to set the second state variable of the apparatus as the first state variable in the response message incremented by one, wherein
the recovering entity is configured to recover the first state variable of the first tunnel endpoint when the second state variable in the response message equals the first state variable of the apparatus incremented by one,
the transmitter is configured to initiate a new session between the apparatus and the second tunnel endpoint by sending a session initiation request message to the second tunnel endpoint, wherein state variables in the session initiation request message are set as current first and second state variables of the apparatus,
the receiver is configured to receive a session initiation response message from the second tunnel endpoint, wherein the state variables in the session initiation response message comprise the first and second state variables of the second tunnel endpoint,
the recovering entity is configured to recover the second state variable of the first tunnel endpoint from the first state variable of the second tunnel endpoint present in the session initiation response message, and
the transmitter is configured to disconnect the initiated session by sending a disconnecting message to the second tunnel endpoint,
wherein the first state variable comprises a sequence number for sent messages and the second state variable comprises a sequence number for received messages.

14. The system according to claim 13, wherein when the second state variable in the response message does not equal the first state variable of the backup tunnel endpoint incremented by one
the recovering entity is configured to set the first state variable of the backup tunnel endpoint as the second state variable in the response message,
the transmitter is configured to send a hello message to the second tunnel endpoint, wherein the state variables in the hello message are set as current first and second state variables of the backup tunnel endpoint,
the receiver is configured to receive a response message from the second tunnel endpoint, wherein the state variables in the response message comprise first and second state variables of the second tunnel endpoint,
the recovering entity is configured to set the second state variable of the backup tunnel endpoint as the first state variable in the response message incremented by one; and
the recovering entity is configured to recover the first state variable of the first tunnel endpoint when the second state variable in the response message equals the first state variable of the backup tunnel endpoint incremented by one.

15. The system according to claim 13, wherein
the transmitter is configured to send an incoming call request message to the second tunnel endpoint as the session initiation request message, and
the receiver is configured to receive an incoming call reply message as the session initiation response message.

16. The system according to claim 13, wherein
the transmitter is configured to send an Outgoing call Request message to the second tunnel endpoint as the session initiation request message, and
the receiver is configured to receive an Outgoing call reply message as the session initiation response message.

17. The system according to claim 13, wherein the first state variable comprises the sequence number of a last sent message and the second state variable comprises a next sequence number expected to receive.

18. The system according to claim 13, wherein the tunnel endpoints comprise Layer Two Tunneling Protocol tunnel endpoints.

19. A computer program embodied on a computer readable medium, the computer program being configured to control a data processing device to perform:
detecting a crash of a first tunnel endpoint with a backup tunnel endpoint of the first tunnel endpoint;
sending a hello message to the second tunnel endpoint from the backup tunnel endpoint, wherein state variables in the hello message are set as current first and second state variables of the backup tunnel endpoint,
receiving a response message from the second tunnel endpoint, wherein state variables in the response message comprise first and second state variables of the second tunnel endpoint,
setting the second state variable of the backup tunnel endpoint as the first state variable in the response message incremented by one,
recovering the first state variable of the first tunnel endpoint when the second state variable in the response message equals the first state variable of the backup tunnel endpoint incremented by one,
initiating a new session between the backup tunnel endpoint and the second tunnel endpoint,
sending a session initiation request message from the backup tunnel endpoint to the second tunnel endpoint, wherein state variables in the session initiation request message are set as current first and second state variables of the backup tunnel endpoint, receiving a session initiation response message from the second tunnel endpoint, wherein state variables in the session initiation response message comprise the first and second state variables of the second tunnel endpoint, recovering the second state variable of the first tunnel endpoint from the first state variable of the second tunnel endpoint present in the session initiation response message, and disconnecting the initiated session, wherein the first state variable comprises a sequence number for sent messages and the second state variable comprises a sequence number for received messages.

20. The computer program according to claim 19, wherein when the second state variable of the second tunnel endpoint in the response message does not equal the first state variable of the backup tunnel endpoint incremented by one, said program is further configured to perform setting the first state variable of the backup tunnel endpoint as the second state variable in the response message;

sending a hello message to the second tunnel endpoint from the backup tunnel endpoint, wherein the state variables in the hello message are set as current first and second state variables of the backup tunnel endpoint;

receiving a response message from the second tunnel endpoint, wherein the state variables in the response message comprise the first and second state variables of the second tunnel endpoint;

setting the second state variable of the backup tunnel endpoint as the first state variable in the response message incremented by one; and recovering the first state variable of the first tunnel endpoint when the second state variable in the response message equals the first state variable of the backup tunnel endpoint incremented by one.

21. The computer program according to claim 19, wherein said program further configured to perform:

sending an incoming call request message to the second tunnel endpoint as the session initiation request message; and receiving an incoming call reply message as the session initiation response message.

22. The computer program according to claim 19, wherein said program further configured to perform:

sending an outgoing call request message to the second tunnel endpoint as the session initiation request message; and receiving an outgoing call reply message as the session initiation response message.

23. The computer program according to claim 19, wherein the first state variable comprises the sequence number of a last sent message and the second state variable comprises a next sequence number expected to receive.

24. An apparatus, comprising:

detecting means for detecting a crash of a first tunnel endpoint;

sending means for sending a hello message to the second tunnel endpoint from the backup tunnel endpoint, wherein state variables in the hello message are set as current first and second state variables of the backup tunnel endpoint, receiving means for receiving a response message from the second tunnel endpoint, wherein state variables in the response message comprise first and second state variables of the second tunnel endpoint, setting means for setting the second state variable of the backup tunnel endpoint as the first state variable in the response message incremented by one, recovering means for recovering the first state variable of the first tunnel endpoint when the second state variable in the response message equals the first state variable of the backup tunnel endpoint incremented by one, initiating means for initiating a new session between the backup tunnel endpoint and the second tunnel endpoint, wherein the sending means are configured to send a session initiation request message from the backup tunnel endpoint to the second tunnel endpoint, wherein state variables in the session initiation request message are set as current first and second state variables of the backup tunnel endpoint, the receiving means receives a session initiation response message from the second tunnel endpoint, wherein state variables in the session initiation response message comprise the first and second state variables of the second tunnel endpoint, the recovering means recovers the second state variable of the first tunnel endpoint from the first state variable of the second tunnel endpoint present in the session initiation response message, and disconnecting means for disconnecting the initiated session, wherein the first state variable comprises a sequence number for sent messages and the second state variable comprises a sequence number for received messages.

25. A system, comprising:

a first tunnel endpoint;

a backup tunnel endpoint for the first tunnel endpoint;

a second tunnel endpoint;

a point to point connection between the first tunnel endpoint and the second tunnel endpoint;

a first state variable in each of the first and second tunnel endpoints comprising a sequence number for sent messages; and a second state variable in each of the first and second tunnel endpoints comprising a sequence number for received messages, wherein the backup tunnel endpoint comprises detecting means for detecting a crash of the first tunnel endpoint, sending means for sending a hello message to the second tunnel endpoint from the backup tunnel endpoint, wherein state variables in the hello message are set as current first and second state variables of the backup tunnel endpoint, receiving means for receiving a response message from the second tunnel endpoint, wherein state variables in the response message comprise the first and second state variables of the second tunnel endpoint, setting means for setting the second state variable of the backup tunnel endpoint as the first state variable in the response message incremented by one, recovering means for recovering the first state variable of the first tunnel endpoint when the second state variable in the response message equals the first state variable of the backup tunnel endpoint incremented by one, initiating means for initiating a new session between the backup tunnel endpoint and the second tunnel endpoint, wherein the sending means sends a session initiation request message from the backup tunnel endpoint to the second tunnel endpoint, wherein state variables in the session initiation request message are set as current first and second state variables of the backup tunnel endpoint, the receiving means receives a session initiation response message from the second tunnel endpoint, wherein state variables in the session initiation response message comprise the first and second state variables of the second tunnel endpoint, the recovering means recovers the second state variable of the first tunnel endpoint from the first state variable of the second tunnel endpoint present in the session initiation response message, and disconnecting means for disconnecting the initiated session, wherein the first state variable comprises a sequence number for sent messages and the second state variable comprises a sequence number for received messages.

* * * * *

UNITED STATES PATENT AND TRADEMARK OFFICE
CERTIFICATE OF CORRECTION

| | |
|---|---|
| PATENT NO. | : 7,512,061 B2 |
| APPLICATION NO. | : 11/099540 |
| DATED | : March 31, 2009 |
| INVENTOR(S) | : Julius Karlsson |

It is certified that error appears in the above-identified patent and that said Letters Patent is hereby corrected as shown below:

On Page 7 of the Patent, allowed (renumbered) claims 3 and 4 were omitted. Therefore, all subsequent claims in the Patent have been misnumbered. Claims 3-25 should read as follows:

3. The method according to claim 1, further comprising:
sending an incoming call request message to the second tunnel endpoint as the session initiation request message; and
receiving an incoming call reply message as the session initiation response message.

4. The method according to claim 1, further comprising:
sending an outgoing call request message to the second tunnel endpoint as the session initiation request message; and
receiving an outgoing call reply message as the session initiation response message.

5. The method according to claim 1, wherein the first state variable comprises the sequence number of a last sent message and the second state variable comprises a next sequence number expected to receive.

6. The method according to claim 1, wherein the point to point connection is a Layer Two Tunneling Protocol tunnel.

7. An apparatus, comprising:
a detector configured to detect a crash of a first tunnel endpoint,
a transmitter configured to send a hello message to a second tunnel endpoint, wherein state variables in the hello message are set as current first and second state variables of the apparatus,
a receiver configured to receive a response message from the second tunnel endpoint, wherein state variables in the response message comprise first and second state variables of the second tunnel endpoint,
a recovering entity configured to set the second state variable of the apparatus as the first state variable in the response message incremented by one, wherein
the recovering entity is configured to recover the first state variable of the first tunnel endpoint when the second state variable in the response message equals the first state variable of the apparatus incremented by one,
the transmitter is configured to initiate a new session between the apparatus and the second tunnel endpoint by sending a session initiation request message to the second tunnel endpoint, wherein state variables in the session initiation request message are set as current first and second state variables of the apparatus, the receiver is configured to receive a session initiation response message from the second tunnel endpoint, wherein

UNITED STATES PATENT AND TRADEMARK OFFICE
CERTIFICATE OF CORRECTION

| | |
|---|---|
| PATENT NO. | : 7,512,061 B2 |
| APPLICATION NO. | : 11/099540 |
| DATED | : March 31, 2009 |
| INVENTOR(S) | : Julius Karlsson |

It is certified that error appears in the above-identified patent and that said Letters Patent is hereby corrected as shown below:

state variables in the session initiation response message comprise the first and second state variables of the second tunnel endpoint,
the recovering entity is configured to recover the second state variable of the first tunnel endpoint from the first state variable of the second tunnel endpoint present in the session initiation response message, and the transmitter is configured to disconnect the initiated session by sending a disconnecting message to the second tunnel endpoint,
wherein the first state variable comprises a sequence number for sent messages and the second state variable comprises a sequence number for received messages.

8. The apparatus according to claim 7, wherein when the second state variable of the second tunnel endpoint in the response message does not equal the first state variable of a backup tunnel endpoint incremented by one the recovering entity is configured to set the first state variable of the apparatus as the second state variable in the response message,
the transmitter is configured to send a hello message to the second tunnel endpoint, wherein the state variables in the hello message are set as current first and second state variables of the apparatus,
the receiver is configured to receive a response message from the second tunnel endpoint, wherein the state variables in the response message comprise first and second state variables of the second tunnel endpoint, the recovering entity is configured to set the second state variable of the apparatus as the first state variable in the response message incremented by one, and
the recovering entity is configured to recover the first state variable of the first tunnel endpoint when the second state variable in the response message equals the first state variable of the apparatus incremented by one.

9. The apparatus according to claim 7, wherein
the transmitter is configured to send an incoming call request message to the second tunnel endpoint as the session initiation request message, and
the receiver is configured to receive an incoming call reply message as the session initiation response message.

10. The apparatus according to claim 7, wherein
the transmitter is configured to send an outgoing call request message to the second tunnel endpoint as the session initiation request message, and
the receiver is configured to receive an outgoing call reply message as the session initiation response message.

UNITED STATES PATENT AND TRADEMARK OFFICE
CERTIFICATE OF CORRECTION

| | |
|---|---|
| PATENT NO. | : 7,512,061 B2 |
| APPLICATION NO. | : 11/099540 |
| DATED | : March 31, 2009 |
| INVENTOR(S) | : Julius Karlsson |

It is certified that error appears in the above-identified patent and that said Letters Patent is hereby corrected as shown below:

11. The apparatus according to claim 7, wherein the first state variable comprises the sequence number of a last sent message and the second state variable comprises a next sequence number expected to receive.

12. The apparatus according to claim 7, wherein the apparatus comprises a Layer Two Tunneling Protocol tunnel endpoint.

13. A system, comprising:
a first tunnel endpoint;
a backup tunnel endpoint for the first tunnel endpoint;
a second tunnel endpoint;
a point to point connection between the first tunnel endpoint and the second tunnel endpoint;
a first state variable in each of the first and second tunnel endpoints comprising a sequence number for sent messages; and
a second state variable in each of the first and second tunnel endpoints comprising a sequence number for received messages, wherein the backup tunnel endpoint comprises a detector configured to detect a crash of the first tunnel endpoint,
a transmitter configured to send a hello message to the second tunnel endpoint, wherein state variables in the hello message are set as current first and second state variables of the apparatus,
a receiver configured to receive a response message from the second tunnel endpoint, wherein state variables in the response message comprise the first and second state variables of the second tunnel endpoint,
a recovering entity configured to set the second state variable of the apparatus as the first state variable in the response message incremented by one, wherein
the recovering entity is configured to recover the first state variable of the first tunnel endpoint when the second state variable in the response message equals the first state variable of the apparatus incremented by one,
the transmitter is configured to initiate a new session between the apparatus and the second tunnel endpoint by sending a session initiation request message to the second tunnel endpoint, wherein state variables in the session initiation request message are set as current first and second state variables of the apparatus,
the receiver is configured to receive a session initiation response message from the second tunnel endpoint,
wherein the state variables in the session initiation response message comprise the first and second state variables of the second tunnel endpoint,

UNITED STATES PATENT AND TRADEMARK OFFICE
CERTIFICATE OF CORRECTION

| | | |
|---|---|---|
| PATENT NO. | : 7,512,061 B2 | Page 4 of 8 |
| APPLICATION NO. | : 11/099540 | |
| DATED | : March 31, 2009 | |
| INVENTOR(S) | : Julius Karlsson | |

It is certified that error appears in the above-identified patent and that said Letters Patent is hereby corrected as shown below:

the recovering entity is configured to recover the second state variable of the first tunnel endpoint from the first state variable of the second tunnel endpoint present in the session initiation response message, and
the transmitter is configured to disconnect the initiated session by sending a disconnecting message to the second tunnel endpoint,
wherein the first state variable comprises a sequence number for sent messages and the second state variable comprises a sequence number for received messages.

14. The system according to claim 13, wherein when the second state variable in the response message does not equal the first state variable of the backup tunnel endpoint incremented by one
the recovering entity is configured to set the first state variable of the backup tunnel endpoint as the second state variable in the response message,
the transmitter is configured to send a hello message to the second tunnel endpoint, wherein the state variables in the hello message are set as current first and second state variables of the backup tunnel endpoint,
the receiver is configured to receive a response message from the second tunnel endpoint, wherein the state variables in the response message comprise first and second state variables of the second tunnel endpoint,
the recovering entity is configured to set the second state variable of the backup tunnel endpoint as the first state variable in the response message incremented by one; and
the recovering entity is configured to recover the first state variable of the first tunnel endpoint when the second state variable in the response message equals the first state variable of the backup tunnel endpoint incremented by one.

15. The system according to claim 13, wherein
the transmitter is configured to send an incoming call request message to the second tunnel endpoint as the session initiation request message, and
the receiver is configured to receive an incoming call reply message as the session initiation response message.

16. The system according to claim 13, wherein
the transmitter is configured to send an Outgoing call Request message to the second tunnel endpoint as the session initiation request message, and
the receiver is configured to receive an Outgoing call reply message as the session initiation response message.

UNITED STATES PATENT AND TRADEMARK OFFICE
CERTIFICATE OF CORRECTION

| | | |
|---|---|---|
| PATENT NO. | : 7,512,061 B2 | |
| APPLICATION NO. | : 11/099540 | |
| DATED | : March 31, 2009 | |
| INVENTOR(S) | : Julius Karlsson | |

It is certified that error appears in the above-identified patent and that said Letters Patent is hereby corrected as shown below:

17. The system according to claim 13, wherein the first state variable comprises the sequence number of a last sent message and the second state variable comprises a next sequence number expected to receive.

18. The system according to claim 13, wherein the tunnel endpoints comprise Layer Two Tunneling Protocol tunnel endpoints.

19. A computer program embodied on a computer readable medium, the computer program being configured to control a data processing device to perform:
detecting a crash of a first tunnel endpoint with a backup tunnel endpoint of the first tunnel endpoint;
sending a hello message to the second tunnel endpoint from the backup tunnel endpoint, wherein state variables in the hello message are set as current first and second state variables of the backup tunnel endpoint,
receiving a response message from the second tunnel endpoint, wherein state variables in the response
message comprise first and second state variables of the second tunnel endpoint,
setting the second state variable of the backup tunnel endpoint as the first state variable in the response message incremented by one,
recovering the first state variable of the first tunnel endpoint when the second state variable in the response
message equals the first state variable of the backup tunnel endpoint incremented by one,
initiating a new session between the backup tunnel endpoint and the second tunnel endpoint,
sending a session initiation request message from the backup tunnel endpoint to the second tunnel endpoint,
wherein state variables in the session initiation request message are set as current first and second state variables of the backup tunnel endpoint,
receiving a session initiation response message from the second tunnel endpoint,
wherein state variables in the session initiation response message comprise the first and second state variables of the second tunnel endpoint,
recovering the second state variable of the first tunnel endpoint from the first state variable of the second tunnel endpoint present in the session initiation response message, and
disconnecting the initiated session,
wherein the first state variable comprises a sequence number for sent messages and the second state variable comprises a sequence number for received messages.

UNITED STATES PATENT AND TRADEMARK OFFICE
CERTIFICATE OF CORRECTION

| | |
|---|---|
| PATENT NO. | : 7,512,061 B2 |
| APPLICATION NO. | : 11/099540 |
| DATED | : March 31, 2009 |
| INVENTOR(S) | : Julius Karlsson |

It is certified that error appears in the above-identified patent and that said Letters Patent is hereby corrected as shown below:

20. The computer program according to claim 19, wherein when the second state variable of the second tunnel endpoint in the response message does not equal the first state variable of the backup tunnel endpoint incremented by one, said program is further configured to perform:
setting the first state variable of the backup tunnel endpoint as the second state variable in the response message;
sending a hello message to the second tunnel endpoint from the backup tunnel endpoint, wherein the state variables in the hello message are set as current first and second state variables of the backup tunnel endpoint;
receiving a response message from the second tunnel endpoint, wherein the state variables in the response message comprise the first and second state variables of the second tunnel endpoint;
setting the second state variable of the backup tunnel endpoint as the first state variable in the response message incremented by one; and
recovering the first state variable of the first tunnel endpoint when the second state variable in the responsemessage equals the first state variable of the backup tunnel endpoint incremented by one.

21. The computer program according to claim 19, wherein said program further configured to perform:
sending an incoming call request message to the second tunnel endpoint as the session initiation request message; and
receiving an incoming call reply message as the session initiation response message.

22. The computer program according to claim 19, wherein said program further configured to perform:
sending an outgoing call request message to the second tunnel endpoint as the session initiation request message; and
receiving an outgoing call reply message as the session initiation response message.

23. The computer program according to claim 19, wherein the first state variable comprises the sequence number of a last sent message and the second state variable comprises a next sequence number expected to receive.

24. An apparatus, comprising:
detecting means for detecting a crash of a first tunnel endpoint;
sending means for sending a hello message to the second tunnel endpoint from the backup tunnel endpoint,
wherein state variables in the hello message are set as current first and second state variables of the backup tunnel endpoint,

UNITED STATES PATENT AND TRADEMARK OFFICE
CERTIFICATE OF CORRECTION

| | | |
|---|---|---|
| PATENT NO. | : 7,512,061 B2 | |
| APPLICATION NO. | : 11/099540 | |
| DATED | : March 31, 2009 | |
| INVENTOR(S) | : Julius Karlsson | |

It is certified that error appears in the above-identified patent and that said Letters Patent is hereby corrected as shown below:

receiving means for receiving a response message from the second tunnel endpoint, wherein state variables in the response message comprise first and second state variables of the second tunnel endpoint,
setting means for setting the second state variable of the backup tunnel endpoint as the first state variable in the response message incremented by one,
recovering means for recovering the first state variable of the first tunnel endpoint when the second state variable in the response message equals the first state variable of the backup tunnel endpoint incremented by one,
initiating means for initiating a new session between the backup tunnel endpoint and the second tunnel endpoint, wherein
the sending means are configured to send a session initiation request message from the backup tunnel endpoint to the second tunnel endpoint, wherein state variables in the session initiation request message are set as current first and second state variables of the backup tunnel endpoint,
the receiving means receives a session initiation response message from the second tunnel endpoint, wherein state variables in the session initiation response message comprise the first and second state variables of the second tunnel endpoint,
the recovering means recovers the second state variable of the first tunnel endpoint from the first state variable of the second tunnel endpoint present in the session initiation response message, and
disconnecting means for disconnecting the initiated session,
wherein the first state variable comprises a sequence number for sent messages and the second state variable comprises a sequence number for received messages.

25. A system, comprising:
a first tunnel endpoint;
a backup tunnel endpoint for the first tunnel endpoint;
a second tunnel endpoint;
a point to point connection between the first tunnel endpoint and the second tunnel endpoint;
a first state variable in each of the first and second tunnel endpoints comprising a sequence number for sent messages; and
a second state variable in each of the first and second tunnel endpoints comprising a sequence number for received messages, wherein the backup tunnel endpoint comprises detecting means for detecting a crash of the first tunnel endpoint,
sending means for sending a hello message to the second tunnel endpoint from the backup tunnel endpoint, wherein
state variables in the hello message are set as current first and second state variables of the backup tunnel endpoint,

UNITED STATES PATENT AND TRADEMARK OFFICE
CERTIFICATE OF CORRECTION

| | | |
|---|---|---|
| PATENT NO. | : 7,512,061 B2 | |
| APPLICATION NO. | : 11/099540 | |
| DATED | : March 31, 2009 | |
| INVENTOR(S) | : Julius Karlsson | |

It is certified that error appears in the above-identified patent and that said Letters Patent is hereby corrected as shown below:

receiving means for receiving a response message from the second tunnel endpoint, wherein state variables in the response message comprise the first and second state variables of the second tunnel endpoint,
setting means for setting the second state variable of the backup tunnel endpoint as the first state variable in the response message incremented by one,
recovering means for recovering the first state variable of the first tunnel endpoint when the second state variable in the response message equals the first state variable of the backup tunnel endpoint incremented by one,
initiating means for initiating a new session between the backup tunnel endpoint and the second tunnel endpoint, wherein
the sending means sends a session initiation request message from the backup tunnel endpoint to the second tunnel endpoint, wherein state variables in the session initiation request message are set as current first and second state variables of the backup tunnel endpoint,
the receiving means receives a session initiation response message from the second tunnel endpoint, wherein state variables in the session initiation response message comprise the first and second state variables of the second tunnel endpoint,
the recovering means recovers the second state variable of the first tunnel endpoint from the first state variable of the second tunnel endpoint present in the session initiation response message, and
disconnecting means for disconnecting the initiated session,
wherein the first state variable comprises a sequence number for sent messages and the second state variable comprises a sequence number for received messages.

Signed and Sealed this

Twelfth Day of May, 2009

JOHN DOLL
*Acting Director of the United States Patent and Trademark Office*

UNITED STATES PATENT AND TRADEMARK OFFICE
CERTIFICATE OF CORRECTION

| | |
|---|---|
| PATENT NO. | : 7,512,061 B2 |
| APPLICATION NO. | : 11/099540 |
| DATED | : March 31, 2009 |
| INVENTOR(S) | : Julius Karlsson |

It is certified that error appears in the above-identified patent and that said Letters Patent is hereby corrected as shown below:

On Page 7 of the Patent, allowed (renumbered) claims 3 and 4 were omitted. Therefore, all subsequent claims in the Patent have been misnumbered. Column 7, line 48 thru Column 14, line 7, Claims 3-25 should read as follows:

3. The method according to claim 1, further comprising:
sending an incoming call request message to the second tunnel endpoint as the session initiation request message; and
receiving an incoming call reply message as the session initiation response message.

4. The method according to claim 1, further comprising:
sending an outgoing call request message to the second tunnel endpoint as the session initiation request message; and
receiving an outgoing call reply message as the session initiation response message.

5. The method according to claim 1, wherein the first state variable comprises the sequence number of a last sent message and the second state variable comprises a next sequence number expected to receive.

6. The method according to claim 1, wherein the point to point connection is a Layer Two Tunneling Protocol tunnel.

7. An apparatus, comprising:
a detector configured to detect a crash of a first tunnel endpoint,
a transmitter configured to send a hello message to a second tunnel endpoint, wherein state variables in the hello message are set as current first and second state variables of the apparatus,
a receiver configured to receive a response message from the second tunnel endpoint, wherein state variables in the response message comprise first and second state variables of the second tunnel endpoint,
a recovering entity configured to set the second state variable of the apparatus as the first state variable in the response message incremented by one, wherein
the recovering entity is configured to recover the first state variable of the first tunnel endpoint when the second state variable in the response message equals the first state variable of the apparatus incremented by one,
the transmitter is configured to initiate a new session between the apparatus and the second tunnel endpoint by sending a session initiation request message to the second tunnel endpoint, wherein state variables in the session initiation request message are set as current first and second state variables of the apparatus, the receiver is configured to receive a session initiation response message from the second tunnel endpoint, wherein

UNITED STATES PATENT AND TRADEMARK OFFICE
CERTIFICATE OF CORRECTION

| | |
|---|---|
| PATENT NO. | : 7,512,061 B2 |
| APPLICATION NO. | : 11/099540 |
| DATED | : March 31, 2009 |
| INVENTOR(S) | : Julius Karlsson |

It is certified that error appears in the above-identified patent and that said Letters Patent is hereby corrected as shown below:

state variables in the session initiation response message comprise the first and second state variables of the second tunnel endpoint,
the recovering entity is configured to recover the second state variable of the first tunnel endpoint from the first state variable of the second tunnel endpoint present in the session initiation response message, and the transmitter is configured to disconnect the initiated session by sending a disconnecting message to the second tunnel endpoint,
wherein the first state variable comprises a sequence number for sent messages and the second state variable comprises a sequence number for received messages.

8. The apparatus according to claim 7, wherein when the second state variable of the second tunnel endpoint in the response message does not equal the first state variable of a backup tunnel endpoint incremented by one the recovering entity is configured to set the first state variable of the apparatus as the second state variable in the response message,
the transmitter is configured to send a hello message to the second tunnel endpoint, wherein the state variables in the hello message are set as current first and second state variables of the apparatus,
the receiver is configured to receive a response message from the second tunnel endpoint, wherein the state variables in the response message comprise first and second state variables of the second tunnel endpoint, the recovering entity is configured to set the second state variable of the apparatus as the first state variable in the response message incremented by one, and
the recovering entity is configured to recover the first state variable of the first tunnel endpoint when the second state variable in the response message equals the first state variable of the apparatus incremented by one.

9. The apparatus according to claim 7, wherein
the transmitter is configured to send an incoming call request message to the second tunnel endpoint as the session initiation request message, and
the receiver is configured to receive an incoming call reply message as the session initiation response message.

10. The apparatus according to claim 7, wherein
the transmitter is configured to send an outgoing call request message to the second tunnel endpoint as the session initiation request message, and
the receiver is configured to receive an outgoing call reply message as the session initiation response message.

UNITED STATES PATENT AND TRADEMARK OFFICE
CERTIFICATE OF CORRECTION

| | |
|---|---|
| PATENT NO. | : 7,512,061 B2 |
| APPLICATION NO. | : 11/099540 |
| DATED | : March 31, 2009 |
| INVENTOR(S) | : Julius Karlsson |

It is certified that error appears in the above-identified patent and that said Letters Patent is hereby corrected as shown below:

11. The apparatus according to claim 7, wherein the first state variable comprises the sequence number of a last sent message and the second state variable comprises a next sequence number expected to receive.

12. The apparatus according to claim 7, wherein the apparatus comprises a Layer Two Tunneling Protocol tunnel endpoint.

13. A system, comprising:
a first tunnel endpoint;
a backup tunnel endpoint for the first tunnel endpoint;
a second tunnel endpoint;
a point to point connection between the first tunnel endpoint and the second tunnel endpoint;
a first state variable in each of the first and second tunnel endpoints comprising a sequence number for sent messages; and
a second state variable in each of the first and second tunnel endpoints comprising a sequence number for received messages, wherein the backup tunnel endpoint comprises a detector configured to detect a crash of the first tunnel endpoint,
a transmitter configured to send a hello message to the second tunnel endpoint, wherein state variables in the hello message are set as current first and second state variables of the apparatus,
a receiver configured to receive a response message from the second tunnel endpoint, wherein state variables in the response message comprise the first and second state variables of the second tunnel endpoint,
a recovering entity configured to set the second state variable of the apparatus as the first state variable in the response message incremented by one, wherein
the recovering entity is configured to recover the first state variable of the first tunnel endpoint when the second state variable in the response message equals the first state variable of the apparatus incremented by one,
the transmitter is configured to initiate a new session between the apparatus and the second tunnel endpoint by sending a session initiation request message to the second tunnel endpoint, wherein state variables in the session initiation request message are set as current first and second state variables of the apparatus,
the receiver is configured to receive a session initiation response message from the second tunnel endpoint,
wherein the state variables in the session initiation response message comprise the first and second state variables of the second tunnel endpoint,

UNITED STATES PATENT AND TRADEMARK OFFICE
CERTIFICATE OF CORRECTION

| | |
|---|---|
| PATENT NO. | : 7,512,061 B2 |
| APPLICATION NO. | : 11/099540 |
| DATED | : March 31, 2009 |
| INVENTOR(S) | : Julius Karlsson |

It is certified that error appears in the above-identified patent and that said Letters Patent is hereby corrected as shown below:

the recovering entity is configured to recover the second state variable of the first tunnel endpoint from the first state variable of the second tunnel endpoint present in the session initiation response message, and
the transmitter is configured to disconnect the initiated session by sending a disconnecting message to the second tunnel endpoint,
wherein the first state variable comprises a sequence number for sent messages and the second state variable comprises a sequence number for received messages.

14. The system according to claim 13, wherein when the second state variable in the response message does not equal the first state variable of the backup tunnel endpoint incremented by one
the recovering entity is configured to set the first state variable of the backup tunnel endpoint as the second state variable in the response message,
the transmitter is configured to send a hello message to the second tunnel endpoint, wherein the state variables in the hello message are set as current first and second state variables of the backup tunnel endpoint,
the receiver is configured to receive a response message from the second tunnel endpoint, wherein the state variables in the response message comprise first and second state variables of the second tunnel endpoint,
the recovering entity is configured to set the second state variable of the backup tunnel endpoint as the first state variable in the response message incremented by one; and
the recovering entity is configured to recover the first state variable of the first tunnel endpoint when the second state variable in the response message equals the first state variable of the backup tunnel endpoint incremented by one.

15. The system according to claim 13, wherein
the transmitter is configured to send an incoming call request message to the second tunnel endpoint as the session initiation request message, and
the receiver is configured to receive an incoming call reply message as the session initiation response message.

16. The system according to claim 13, wherein
the transmitter is configured to send an Outgoing call Request message to the second tunnel endpoint as the session initiation request message, and
the receiver is configured to receive an Outgoing call reply message as the session initiation response message.

UNITED STATES PATENT AND TRADEMARK OFFICE
CERTIFICATE OF CORRECTION

| | |
|---|---|
| PATENT NO. | : 7,512,061 B2 |
| APPLICATION NO. | : 11/099540 |
| DATED | : March 31, 2009 |
| INVENTOR(S) | : Julius Karlsson |

It is certified that error appears in the above-identified patent and that said Letters Patent is hereby corrected as shown below:

17. The system according to claim 13, wherein the first state variable comprises the sequence number of a last sent message and the second state variable comprises a next sequence number expected to receive.

18. The system according to claim 13, wherein the tunnel endpoints comprise Layer Two Tunneling Protocol tunnel endpoints.

19. A computer program embodied on a computer readable medium, the computer program being configured to control a data processing device to perform:
detecting a crash of a first tunnel endpoint with a backup tunnel endpoint of the first tunnel endpoint;
sending a hello message to the second tunnel endpoint from the backup tunnel endpoint, wherein state variables in the hello message are set as current first and second state variables of the backup tunnel endpoint,
receiving a response message from the second tunnel endpoint, wherein state variables in the response
message comprise first and second state variables of the second tunnel endpoint,
setting the second state variable of the backup tunnel endpoint as the first state variable in the response message incremented by one,
recovering the first state variable of the first tunnel endpoint when the second state variable in the response
message equals the first state variable of the backup tunnel endpoint incremented by one,
initiating a new session between the backup tunnel endpoint and the second tunnel endpoint,
sending a session initiation request message from the backup tunnel endpoint to the second tunnel endpoint,
wherein state variables in the session initiation request message are set as current first and second state variables of the backup tunnel endpoint,
receiving a session initiation response message from the second tunnel endpoint, wherein state variables in the session initiation response message comprise the first and second state variables of the second tunnel endpoint,
recovering the second state variable of the first tunnel endpoint from the first state variable of the second tunnel endpoint present in the session initiation response message, and
disconnecting the initiated session,
wherein the first state variable comprises a sequence number for sent messages and the second state variable comprises a sequence number for received messages.

UNITED STATES PATENT AND TRADEMARK OFFICE
CERTIFICATE OF CORRECTION

| | |
|---|---|
| PATENT NO. | : 7,512,061 B2 |
| APPLICATION NO. | : 11/099540 |
| DATED | : March 31, 2009 |
| INVENTOR(S) | : Julius Karlsson |

It is certified that error appears in the above-identified patent and that said Letters Patent is hereby corrected as shown below:

20. The computer program according to claim 19, wherein when the second state variable of the second tunnel endpoint in the response message does not equal the first state variable of the backup tunnel endpoint incremented by one, said program is further configured to perform:
setting the first state variable of the backup tunnel endpoint as the second state variable in the response message;
sending a hello message to the second tunnel endpoint from the backup tunnel endpoint, wherein the state variables in the hello message are set as current first and second state variables of the backup tunnel endpoint;
receiving a response message from the second tunnel endpoint, wherein the state variables in the response message comprise the first and second state variables of the second tunnel endpoint;
setting the second state variable of the backup tunnel endpoint as the first state variable in the response message incremented by one; and
recovering the first state variable of the first tunnel endpoint when the second state variable in the responsemessage equals the first state variable of the backup tunnel endpoint incremented by one.

21. The computer program according to claim 19, wherein said program further configured to perform:
sending an incoming call request message to the second tunnel endpoint as the session initiation request message; and
receiving an incoming call reply message as the session initiation response message.

22. The computer program according to claim 19, wherein said program further configured to perform:
sending an outgoing call request message to the second tunnel endpoint as the session initiation request message; and
receiving an outgoing call reply message as the session initiation response message.

23. The computer program according to claim 19, wherein the first state variable comprises the sequence number of a last sent message and the second state variable comprises a next sequence number expected to receive.

24. An apparatus, comprising:
detecting means for detecting a crash of a first tunnel endpoint;
sending means for sending a hello message to the second tunnel endpoint from the backup tunnel endpoint,
wherein state variables in the hello message are set as current first and second state variables of the backup tunnel endpoint,

UNITED STATES PATENT AND TRADEMARK OFFICE
CERTIFICATE OF CORRECTION

| | | |
|---|---|---|
| PATENT NO. | : 7,512,061 B2 | Page 7 of 8 |
| APPLICATION NO. | : 11/099540 | |
| DATED | : March 31, 2009 | |
| INVENTOR(S) | : Julius Karlsson | |

It is certified that error appears in the above-identified patent and that said Letters Patent is hereby corrected as shown below:

receiving means for receiving a response message from the second tunnel endpoint, wherein state variables in the response message comprise first and second state variables of the second tunnel endpoint,
setting means for setting the second state variable of the backup tunnel endpoint as the first state variable in the response message incremented by one,
recovering means for recovering the first state variable of the first tunnel endpoint when the second state variable in the response message equals the first state variable of the backup tunnel endpoint incremented by one,
initiating means for initiating a new session between the backup tunnel endpoint and the second tunnel endpoint, wherein
the sending means are configured to send a session initiation request message from the backup tunnel endpoint to the second tunnel endpoint, wherein state variables in the session initiation request message are set as current first and second state variables of the backup tunnel endpoint,
the receiving means receives a session initiation response message from the second tunnel endpoint, wherein state variables in the session initiation response message comprise the first and second state variables of the second tunnel endpoint,
the recovering means recovers the second state variable of the first tunnel endpoint from the first state variable of the second tunnel endpoint present in the session initiation response message, and
disconnecting means for disconnecting the initiated session,
wherein the first state variable comprises a sequence number for sent messages and the second state variable comprises a sequence number for received messages.

25. A system, comprising:
a first tunnel endpoint;
a backup tunnel endpoint for the first tunnel endpoint;
a second tunnel endpoint;
a point to point connection between the first tunnel endpoint and the second tunnel endpoint;
a first state variable in each of the first and second tunnel endpoints comprising a sequence number for sent messages; and
a second state variable in each of the first and second tunnel endpoints comprising a sequence number for received messages, wherein the backup tunnel endpoint comprises detecting means for detecting a crash of the first tunnel endpoint,
sending means for sending a hello message to the second tunnel endpoint from the backup tunnel endpoint, wherein
state variables in the hello message are set as current first and second state variables of the backup tunnel endpoint,

UNITED STATES PATENT AND TRADEMARK OFFICE
CERTIFICATE OF CORRECTION

PATENT NO. : 7,512,061 B2
APPLICATION NO. : 11/099540
DATED : March 31, 2009
INVENTOR(S) : Julius Karlsson It is certified that error appears in the above-identified patent and that said Letters Patent is hereby corrected as shown below:

receiving means for receiving a response message from the second tunnel endpoint, wherein state variables in the response message comprise the first and second state variables of the second tunnel endpoint,
setting means for setting the second state variable of the backup tunnel endpoint as the first state variable in the response message incremented by one,
recovering means for recovering the first state variable of the first tunnel endpoint when the second state variable in the response message equals the first state variable of the backup tunnel endpoint incremented by one,
initiating means for initiating a new session between the backup tunnel endpoint and the second tunnel endpoint, wherein
the sending means sends a session initiation request message from the backup tunnel endpoint to the second tunnel endpoint, wherein state variables in the session initiation request message are set as current first and second state variables of the backup tunnel endpoint,
the receiving means receives a session initiation response message from the second tunnel endpoint, wherein state variables in the session initiation response message comprise the first and second state variables of the second tunnel endpoint,
the recovering means recovers the second state variable of the first tunnel endpoint from the first state variable of the second tunnel endpoint present in the session initiation response message, and
disconnecting means for disconnecting the initiated session,
wherein the first state variable comprises a sequence number for sent messages and the second state variable comprises a sequence number for received messages.

This certificate supersedes the Certificate of Correction issued May 12, 2009.

Signed and Sealed this

Ninth Day of June, 2009

JOHN DOLL
*Acting Director of the United States Patent and Trademark Office*